US007625109B2

(12) United States Patent
Tsukamoto

(10) Patent No.: US 7,625,109 B2
(45) **Date of Patent: *Dec. 1, 2009**

(54) VEHICLE LAMP

(75) Inventor: Michio Tsukamoto, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 41 days.

This patent is subject to a terminal disclaimer.

(21) Appl. No.: 11/477,946

(22) Filed: Jun. 30, 2006

(65) Prior Publication Data

US 2007/0002577 A1 Jan. 4, 2007

(30) Foreign Application Priority Data

Jun. 30, 2005 (JP) ......................... P. 2005-192879
Jun. 30, 2005 (JP) ......................... P. 2005-192880

(51) Int. Cl.
*B60Q 1/00* (2006.01)
*B60Q 3/00* (2006.01)
*F21V 7/00* (2006.01)

(52) U.S. Cl. ....................... 362/538; 362/539; 362/516; 362/297; 362/303

(58) Field of Classification Search ................. 362/539, 362/538, 516–518, 297, 303
See application file for complete search history.

(56) References Cited

U.S. PATENT DOCUMENTS 4,885,669 A * 12/1989 Nino .......................... 362/517
4,918,580 A * 4/1990 Nino .......................... 362/539
5,158,352 A * 10/1992 Ikegami et al. .............. 362/539
5,215,368 A * 6/1993 Neumann ................... 362/518
5,396,407 A * 3/1995 Taniuchi ..................... 362/518
5,673,990 A * 10/1997 Neumann et al. ........... 362/513
5,899,559 A * 5/1999 Lachmayer et al. ......... 362/513
5,961,206 A * 10/1999 Eichler ....................... 362/307
6,007,223 A * 12/1999 Futami ....................... 362/517
6,186,651 B1 * 2/2001 Sayers et al. ................ 362/512
6,554,460 B1 * 4/2003 Saladin ....................... 362/539
6,742,920 B2 * 6/2004 Takada et al. ............... 362/539
6,821,008 B2 * 11/2004 Tokoro et al. ............... 362/539
7,144,143 B2 * 12/2006 Matsumoto ................. 362/517
7,281,830 B2 * 10/2007 Ishida ........................ 362/538
7,367,703 B2 * 5/2008 Yagi et al. ................... 362/539
2003/0193813 A1 * 10/2003 Collins ....................... 362/465

FOREIGN PATENT DOCUMENTS

| | | |
|---|---|---|
| FR | 1.253.538 | 1/1961 |
| JP | 63-314701 A | 12/1988 |
| JP | 7-31921 B2 | 4/1995 |
| JP | 2003-123519 A | 4/2003 |

* cited by examiner

*Primary Examiner*—Jong-Suk (James) Lee
*Assistant Examiner*—David J Makiya
(74) *Attorney, Agent, or Firm*—Sughrue Mion, PLLC

(57) ABSTRACT

A vehicle lamp is provided with: a projector lens; a light source; a reflector with a focal point near the light source having a reflecting surface from which the light emitted from the light source is reflected toward the projector lens; and a shade with an end in the vicinity of a rear focal point of the projector lens, for shielding a part of the reflected light. A rear end face of the projector lens inclines from an optical axis so that the lower end of the projector lens protrudes more forward than the upper end of the projector lens. The reflector has a correcting step for correcting a distributed light pattern projected forward.

15 Claims, 15 Drawing Sheets

VEHICLE LAMP

The present application claims foreign priorities based on Japanese Patent Application No. P.2005-192879 filed on Jun. 30, 2005, and No. P.2005-192880 filed on Jun. 30, 2005, the contents of which are incorporated herein by reference.

BACKGROUND OF THE INVENTION

1. Field of the Invention

The present invention relates to a vehicle lamp provided with a projector-type lamp unit.

2. Related Art

Generally, a vehicle lamp is designed as a structure in which a lamp unit, having an optical axis extending in a vehicle longitudinal direction, is accommodated within a lamp room including a lamp body and a light-transmissive cover attached to a front opening of the lamp body. An example of the lamp unit is the projector-type lamp unit disclosed in e.g. JP-A-63-314701.

In the projector-type lamp unit, a projector lens is arranged on an optical axis, and a light source is arranged on a rear side of a rear focal point of the projector lens. In addition, the light emitted from the light source is reflected near the optical axis by a reflector. In this case, a planoconvex lens is generally employed as the projector lens. The planoconvex lens is convex in the front face and planar in the rear end face. In the projector lens, a line connecting the upper and lower ends of the rear end face, which is a plane opposite to the reflector, is arranged in parallel to a vertical line.

However, the conventional type headlamp presents the following problems. Namely, in a light distribution for passing (that is, a lower beam distribution), substantially half of the quantity of light is shielded by a shade so that the efficiency of the light distribution is low. In addition, since only the projector lens is seen when the vehicle lamp is mounted on a vehicle, the design does not appear new any more.

Thus, in the projector-type lamp unit disclosed in e.g. JP-A-2003-123519 and JP-B-07-031921, by making the front face of the projector lens convex and inclining the line connecting the upper and lower ends of the rear end face from the vertical line, the entire light is oriented downward by the prism operation of the projector lens so that the shielded quantity of light by the shade is reduced to improve brightness and the design appears new.

However, in the vehicle lamp with the projector lens inclined as described above, when the conventional shade and reflector are attached, a horizontal cut-line suited to a light distribution regulation cannot be formed. Specifically, in a conventional shade 1, as seen from FIG. 15(*a*), the upper edge is composed of horizontal straight-line segments 1*a* and 1*b* when seen from the direction of the optical axis of the projector lens. This is intended to provide a linear cut off line corresponding to the imaging characteristic of the projector lens. However, if the shade 1 is adopted for the inclined projector lens 1, as seen in FIG. 15(*b*), the cut off line 3 is curved downward with diffusion in a right/left direction. This led to a problem that regions 5R, 5L with reduced distant visibility are formed horizontally. Further, a conventional reflector 7 is formed of a curve that reflects the light emitted from a light source 13 in a nearly horizontal direction (direction of arrow 15) in a minute area on a horizontal section 11 passing the optical axis Ax of the projector lens 9 as seen in FIG. 16(*a*). This is intended to diffuse light in the horizontal direction according to the imaging characteristic of the projector lens 9. However, if the conventional reflector 7 is adopted for the inclined projector lens 9, the horizontally diffused light is curved downward as it diffuses. This also led to a problem that regions 17R, 17L with reduced distant visibility are formed horizontally, as shown in FIG. 16(*b*).

SUMMARY OF THE INVENTION

One or more embodiments of the present invention provide a vehicle lamp capable of improving distant visibility in a horizontal diffusing direction even with a structure with an inclined projector lens, thereby improving safety during night driving.

In accordance with one or more embodiments of the present invention, a vehicle lamp is provided with: a light source; a projector lens, wherein a rear end surface of the projector lens is inclined in which a lower end of the rear end surface protrudes more frontward than an upper end of the rear surface; a reflector having a focal point near the light source and having a reflecting surface that reflects light emitted from the light source toward the projector lens; and a shade that shields a part of reflected light and has an end in the vicinity of a rear focal point of the projector lens. In the vehicle lamp, the reflector has a correcting step that corrects a distributed light pattern projected forward.

Further, the projector lens may have a front face structured so that light incident on the projector lens through the rear focal point of the projector lens is projected forward substantially in parallel.

Further, the correcting step may be structured to form the distributed light pattern with a cut-off line substantially in parallel to a horizontal direction.

Further, the correcting step may be provided at an edge of the reflector in the vicinity of an area where the reflecting surface intersects a horizontal plane passing an optical axis of the vehicle lamp.

Further, the correcting step may be formed so that the more distant a distance from the optical axis is, the more downward a normal line of the reflecting surface at the edge is oriented.

Further, the shade may be recessed partially at the left and right sideward areas.

Further, the shade may have a convex portion at a central area that is projected more than the right and left sideward areas.

In addition, in accordance with one or more embodiments of the present invention, a vehicle lamp is provided with: a light source; a projector lens, wherein a rear end surface of the projector lens is inclined in which a lower end of the rear end surface protrudes more frontward than an upper end of the rear surface; a reflector having a focal point near the light source and having a reflecting surface that reflects light emitted from the light source toward the projector lens; and a shade that shields a part of reflected light and has an end in the vicinity of a rear focal point of the projector lens. In the vehicle lamp, the shade has a correcting portions that correct a distributed light pattern projected forward.

Further, the shade may be structured to project the light in right and left sideward direction and to form the distributed light pattern with a cut-off line substantially in parallel to a horizontal direction.

Further, the shade may have a convex portion at a central area that is projected more than the right and left sideward areas.

Further, the reflector may have a correcting step that corrects the distributed light pattern.

Further, the correcting step may be provided at an edge of the reflector in the vicinity of an area where the reflecting surface intersects a horizontal plane passing an optical axis of the vehicle lamp.

Further, the correcting step may be formed so that the more distant a distance from the optical axis is, the more downward a normal line of the reflecting surface at the edge is oriented.

Further, the shade may be recessed partially at the left and right sideward areas.

According to one or more embodiments of the present invention, since the reflector has the correcting step for correcting the distributed light pattern projected forward, the distortion of the distributed light pattern, which is attributed to the fact that light is not projected onto the area to be formed by the light emanating from the projector lens because the rearward surface of the projector lenses is inclined, can be corrected by the correcting step. Thus, it is possible to prevent the cut-off line from being curved with diffusion and enhance the distant visibility in the right/left diffusing direction by light projection onto the distorted portion of the distributed light pattern not light-projected. As a result, safety during night driving can be improved.

Moreover, in accordance with one or more embodiments of the present invention, since the reflector is designed to form a distributed light pattern with a cut-off line in nearly parallel to the horizontal direction by light projection in the right/left sideward direction, the cut-off line is not curved downward with diffusion. So, the light is diffused horizontally to form the distributed light pattern with the horizontal cut-off line, thereby improving the distant visibility in the right/left diffusing direction.

Further, in accordance with one or more embodiments of the present invention, since the correcting step is formed at the edges in the vicinity of the reflecting plane area of the reflector intersecting the horizontal plane, the left or right side of the cut-off line is not curved with diffusion so that light is diffused horizontally, thereby improving the distant visibility in the right/left diffusing direction.

Further, in accordance with one or more embodiments of the present invention, the correcting step is formed so that the normal line of the reflecting surface at the edges is oriented more downward at a farther distance from the optical axis. The cut-off line, therefore, is not curved downward with diffusion. Thus, the reflected light from the light source is oriented more downward toward the outside of the reflector from the optical axis of the projector lens. As a result, the light passing the projector lens inclined is diffused in the right/left horizontal direction, thereby improving the distant visibility in the right/left direction.

Moreover, in accordance with one or more embodiments of the present invention, in the vehicle lamp comprising a projector lens, a light source, a reflector, and a shade, the front face of the projector lens is formed to cause the light incident on the projector lens through the rear focal point to emanate in nearly parallel whereas the rear end surface thereof is inclined from an optical axis so that the lower end of the projector lens protrudes more forward than the upper end of the projector lens, and the shade has a portion for correcting the distributed light pattern. For this reason, the distortion of the distributed light pattern, which is attributed to the fact that light is not projected onto the area to be formed by the light emanating from the projector lens because the rear end face of the projector lens is inclined, can be corrected by the portion. Namely, the shade is deformed according to the characteristic of the projector lens inclined. Therefore, it is possible to prevent the cut-off line from being curved with diffusion by light projection onto the distorted portion of the distributed light pattern not light-projected, thereby enhancing the distant visibility in the right/left diffusing direction. As a result, safety during night driving can be improved.

Further, since the shade is partially recessed at the left and right sideward areas, the distributed light pattern having the cut-off line in nearly parallel to the horizontal direction can be formed by light projection upward from the curved cut-off line through the recessed portion. Thus, the cut-off line is not curved downward with diffusion so that the light can be diffused easily in the horizontal direction by only a change in the shape of the shade.

Further, since the shade is convex at the central area as compared with the right and left sideward areas, the distortion of the distributed light pattern, which is attributed to the fact that light is projected onto the area to which the light emanating from the projector lens is essentially to be not projected because the rear end face of the projector lens is inclined, can be corrected by the convex shape. Thus, the distortion of the distributed light pattern in which the central segment of the cut-off line is swelled can be removed.

Other aspects and advantages of the invention will be apparent from the following description and the appended claims.

BRIEF DESCRIPTION OF THE DRAWINGS

FIG. 10(*b*) is a perspective view of a distributed light pattern formed on a virtual vertical screen which is arranged at a forward position of the lamp, by the light projected forward from the vehicle lamp of the exemplary embodiment of the present invention.

FIG. 13(*b*) is a graph showing a distributed light pattern when the inclining angle is set at 10°.

FIG. 13(*c*) is a graph showing a distributed light pattern when the inclining angle is set at 20°.

FIG. 13(*d*) is a graph showing a distributed light pattern when the inclining angle is set at 30°.

FIG. 13(*e*) is a graph showing a distributed light pattern when the inclining angle is set at 40°.

FIG. 13(*f*) is a graph showing a distributed light pattern when the inclining angle is set at 50°.

FIG. 14(*b*) is a graph showing the distributed light pattern formed by the projector lens with the inclining angle of 20°.

FIG. 14(*c*) is a graph showing the distributed light pattern formed when the shade having of the exemplary embodiment is employed for the projector lens with the inclining angle of 20°.

FIG. 14(*d*) is a graph showing the distributed light pattern formed when the reflector of the exemplary embodiment is employed for the projector lens with the inclining angle of 20°.

FIG. 14(*e*) is a graph showing the distributed light pattern formed when the shade and the reflector of the exemplary embodiment is employed for the projector lens with the inclining angle of 20°.

FIG. 15(*b*) is a view showing the distributed light pattern formed by a conventional vehicle lamp with the conventional shade.

FIG. 16(*b*) is a view showing the distributed light pattern formed by a conventional vehicle lamp with the conventional reflector.

DETAILED DESCRIPTION OF THE EXEMPLARY EMBODIMENTS

Exemplary embodiments of the invention will be described with reference to the accompanying drawings.

Figure 1:
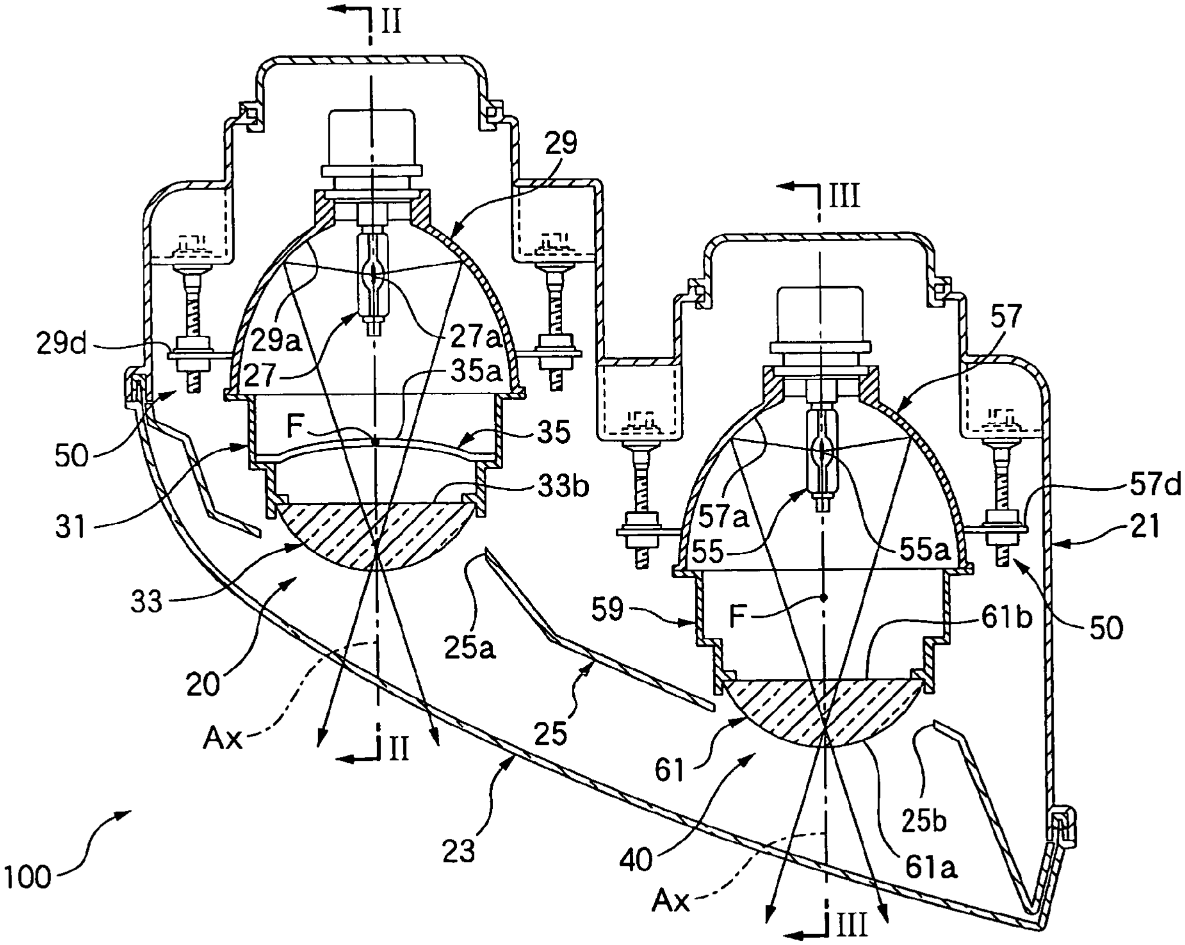
FIG. 1 is a planar sectional view of a vehicle lamp according to an exemplary embodiment of the present invention.
Figure 2:
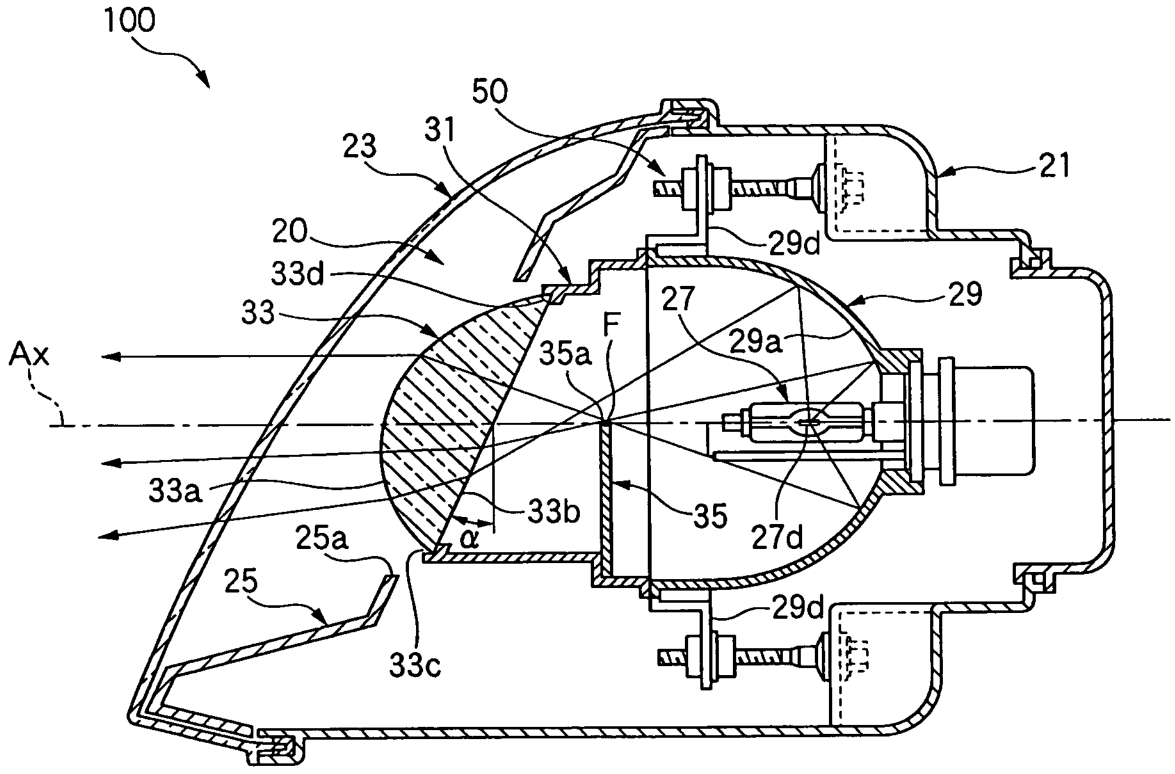
FIG. 2 is a sectional view taken in line II-II in FIG. 1.
Figure 3:
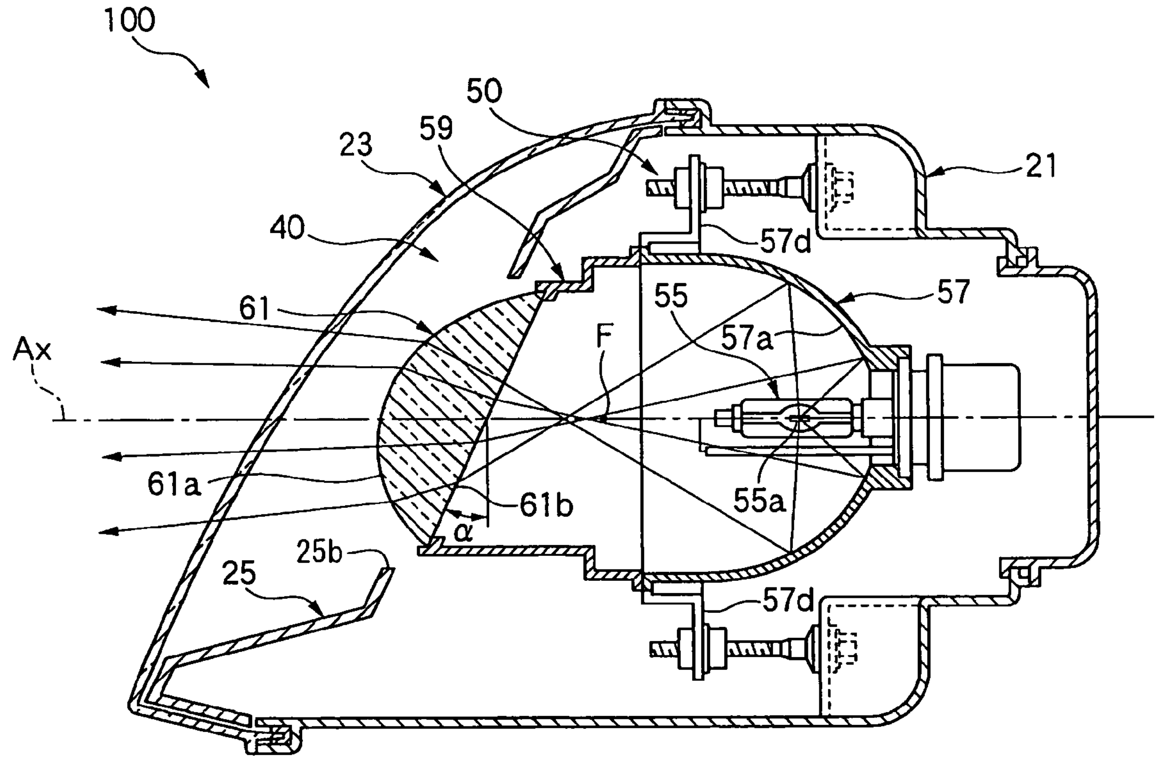
FIG. 3 is a sectional view taken in line III-III in FIG. 1.

FIG. 1 is a planar sectional view of a vehicle lamp 100 according to an exemplary embodiment of the present invention. FIGS. 2 and 3 are sectional views taken in line II-II and in line III-III in FIG. 1.

As seen from these figures, the vehicle lamp 100 is a lamp located at the right front end of a vehicle. Within a lamp room including a lamp body 21 and a transparent light-transmissive cover 23 attached to a front end opening of the lamp body 21, two lamp units 20, 40 are accommodated adjacently to each other in a vehicle width direction. In the vehicle lamp 100, when the lamp unit 20 is lit, a low-beam distributed light pattern is formed, whereas when the lamp units 20, 40 are lit simultaneously, a high-beam distributed light pattern is formed.

Each of these two lamp units 20, 40 has an optical axis Ax extending in a vehicle longitudinal direction, and is attached to the lamp body 21. An aiming mechanism 50 can incline the lamp units 20, 40 vertically and horizontally. When the aiming adjustment by the aiming mechanism 50 has been completed, the optical axis Ax of the lamp unit 20 extends in a downward direction by about 0.5 to 0.6° with respect to the vehicle longitudinal direction, whereas the optical axis Ax of the lamp unit 40 extends in the vehicle longitudinal direction.

The light-transmissive cover 23 is formed along the vehicle shape at the right corner of the vehicle front end so that it spreads rearward from the inside to the outside in the vehicle width direction and spreads rearward from the lower end edge to the upper end edge. Thus, the two lamp units 20, 40 are arranged so that the lamp unit 20 located on the outside in the vehicle width direction is displaced slightly rearward from the lamp unit 40 located on the inside in the vehicle width direction.

Further, within the lamp room, an extension panel 25 is also arranged along the light-transmissive cover 23. The extension panel 25 has openings 25*a*, 25*b* which encircle the lamp units 20, 40 in the vicinity of their front end.

An explanation will be given of the structure of each the lamp-units 20, 40.

First, the structure of the lamp unit 20 will be explained.

Figure 4:
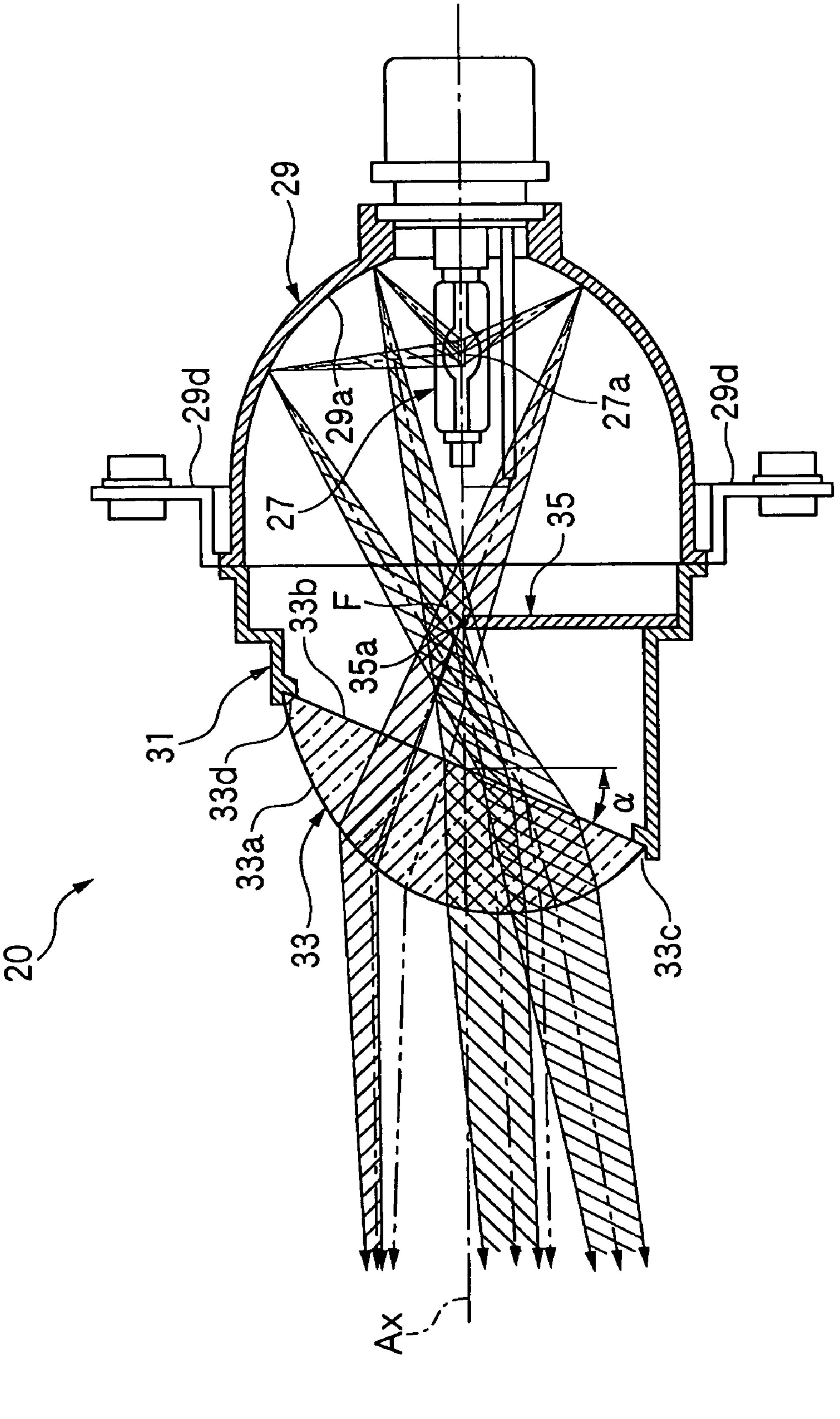
FIG. 4 is a side sectional view showing the lamp unit shown in FIG. 1 as a single unit.
Figure 5:
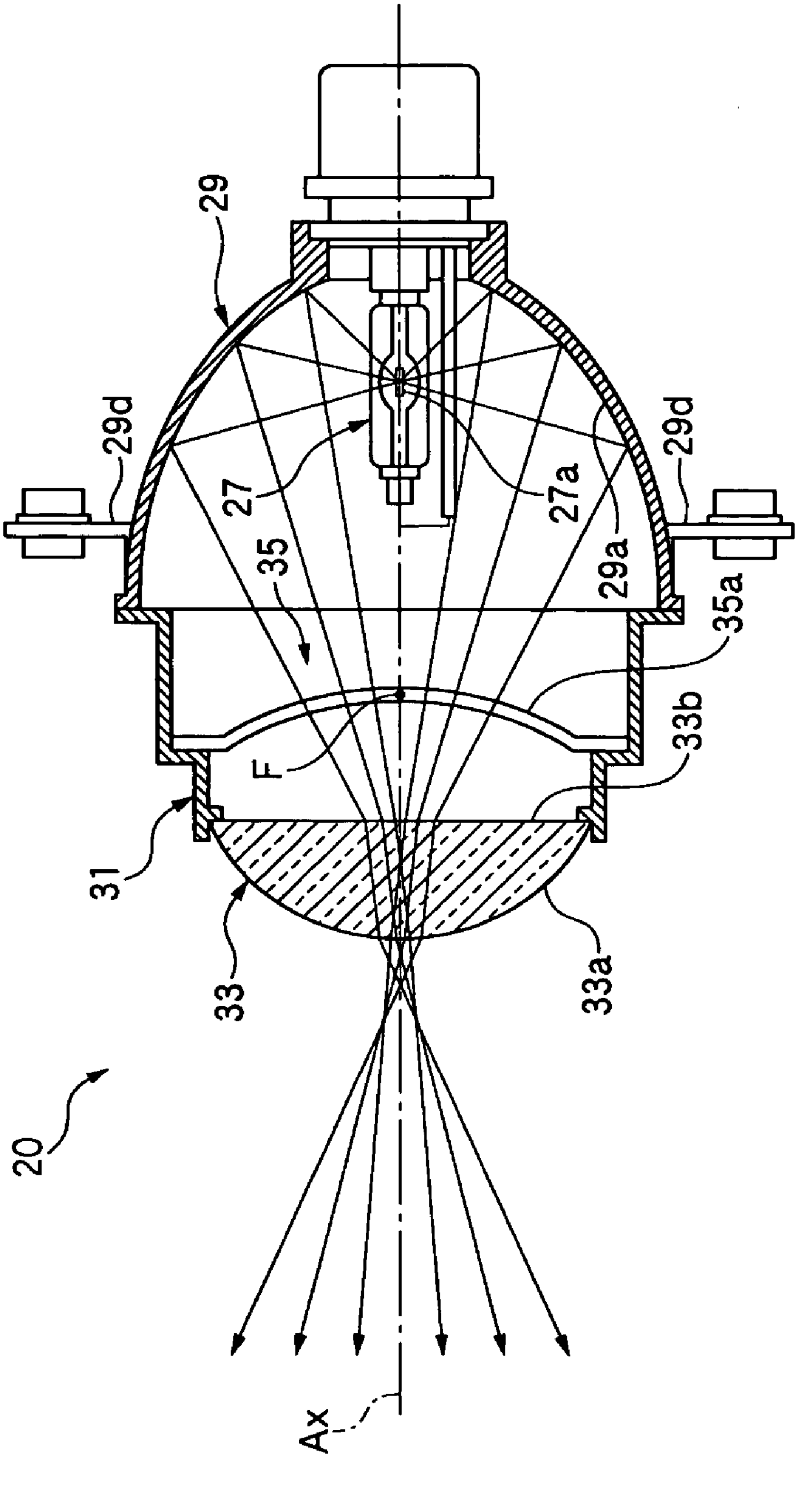
FIG. 5 is a plane sectional view showing the lamp unit shown in FIG. 1 as a single unit.

FIGS. 4 and 5 are a side sectional view and a plane sectional view that show the lamp unit 20 as a single unit.

As seen from these figures, the lamp unit 20 is a projector-type lamp unit that includes a light source bulb 27, a reflector 29, a lens holder 31, a projector lens 33 and a shade 35.

The projector lens 33 is designed as a planoconvex lens, which has a convex curve in the front face (forward surface) 33*a* and a plane in the rear end face (rearward surface) 33*b* and located on the optical axis Ax. The projector lens 33 forward projects the image on a focal plane including its rear focal point F as an inverted image.

The rearward surface 33*b* of the projector lens 33 is inclined with respect to a straight-line segment connecting the light source 27*a* and the rear focal point F of the projector lens 33 so that the lower end 33*c* of the projector lens 33 protrudes forward more than the upper end 33*d* of the projector lens 33. In this embodiment, this straight-line segment is nearly parallel to the emanating direction of the light emanating from the projector lens 33 that has passed through the rear focal point F, i.e. the optical axis Ax. Namely, the plane constituting the rearward surface 33*b* of the projector lens 33 inclines upward from the plane orthogonal to the optical axis Ax. Its upward angel $\alpha$ is set at the value not smaller than 15° (in the embodiment, $\alpha$=20°).

Figure 7:
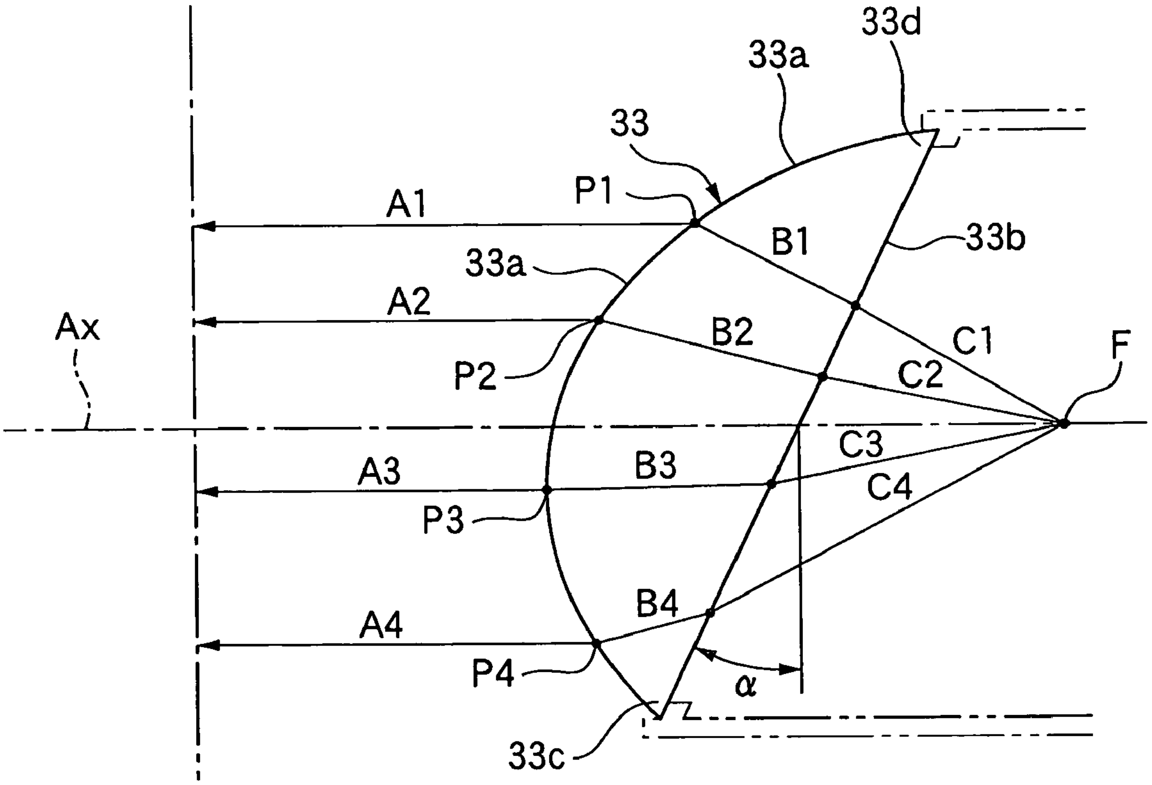
FIG. 7 is a view for explaining the vertical sectional shape of the projector lens shown in FIG. 2.

FIG. 7 is a view for explaining the vertical sectional shape of the projector lens shown in FIG. 2.

The convex curve constituting the forward surface 33*a* of the projector lens 33 is formed as an aspheric surface so that the rear focal point F of the projector lens 33 is located on the optical axis Ax. Thus, the forward surface 33*a* of the projector lens 33 projects the light incident on the projector lens 33 from the rear focal point F in a direction nearly parallel to the optical axis Ax.

The lens holder 31 extends cylindrically forward from the front end opening of the reflector 29 and is tapered with steps. The rear portion of the lens holder 31 is supported firmly by the reflector 29, whereas the front portion of the lens holder 31 firmly supports the lens 33.

The light source bulb 27 is a discharge bulb such as a metal halide bulb with a light source 27*a* serving as a discharging/light-emitting portion. The light source 27*a* is constructed of a linear segment extending in the direction of the bulb center axis. The light source bulb 27 is inserted and secured from the rear side in the rear end opening of the reflector 29 so that the light source 27*a* is located more rearward than the rear focal point F of the projecting the lens 33 on the optical axis Ax.

Figure 6A:
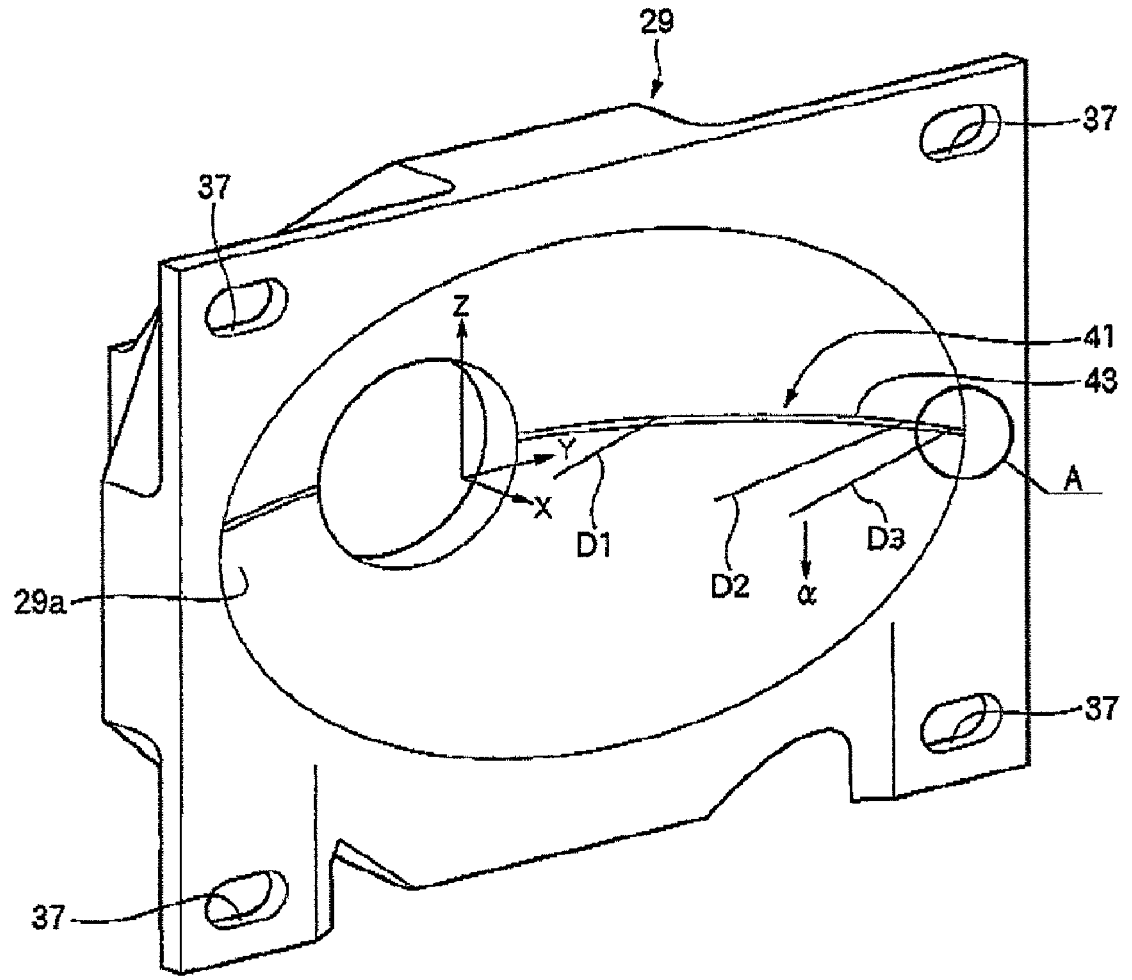
FIGS. 6(*a*) and 6(*b*) are a front perspective view of a reflector and a close-up of the correcting step, respectively.
Figure 6B:
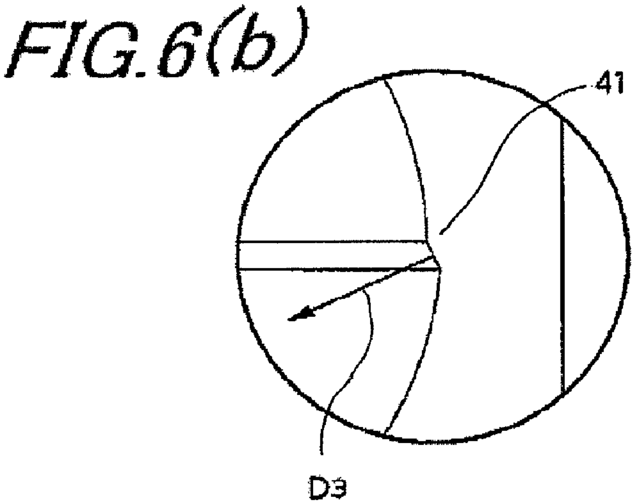

FIG. 6(*a*) is a front perspective view of the reflector. FIG. 6(*b*) is a close-up view of the area denoted by "A" in FIG. 6(*a*).

The reflector 29 has a reflecting surface 29*a* that reflects the light emitted from the light source 27*a* forward near the optical axis Ax. The reflecting surface 29*a* has an elliptical sectional shape. Its eccentricity is set to gradually increase from a vertical section (X-Z section) toward a horizontal section (X-Y section). Thus, the light from the light source 27*a*, reflected from the reflecting surface 29*a* nearly converges in the vicinity of the rear focal point F within the vertical section. The converging position is moved greatly forward within the horizontal section.

Figure 8:
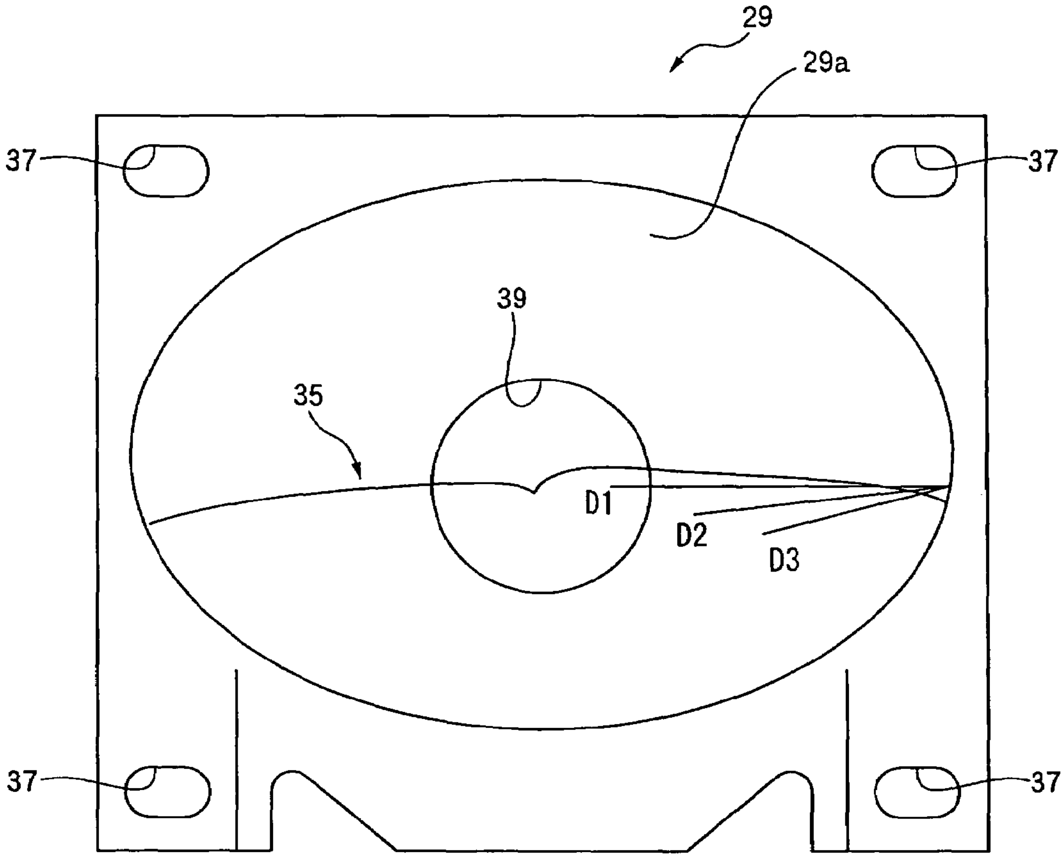
FIG. 8 is a front view of the reflector.

The reflector 29 is supported at its aiming brackets 29*d* through the aiming mechanism 50 by a lamp body 21. In FIG. 8, reference numeral 37 denotes one of stud-bolt fixing slots of the aiming mechanism 50, and reference numeral 39 denotes the rear end opening from which the light source bulb 27 is firmly inserted.

The reflector 29 has a correcting step 41 for correcting the distributed light pattern projected forward. For illustrative purposes, the correcting step 41 is illustrated in FIGS. 6(*a*) and 6(*b*) proportionately larger than it is in the actual exemplary embodiment. The correcting step 41 is provided at the left and right edges 43 in the vicinity of the area where the reflecting surface 29_a_ of the reflector 29 intersects the horizontal plane (X-Y plane) passing the optical axis Ax. The correcting step 41 is formed so that the each edge 43 of the reflecting surface 29_a_ includes, as a step, a normal line Di (i=1, 2, 3, . . . ). The normal line Di is oriented downward more at a farther distance from the optical axis Ax. Namely, normal line D3 inclines downward (arrow a direction) at a larger angle than normal line D1. Thus, the reflected light at the edges 43 is oriented more downward at positions toward the outside of the reflector 29 from the optical axis Ax of the projector lens 33.

Figure 9:
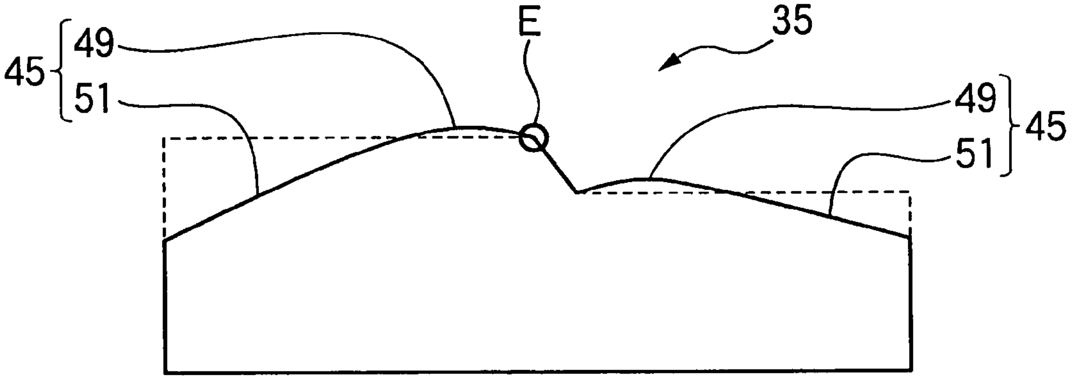
FIG. 9 is a front view of a shade when seen from the light source side.

FIG. 8 is a front view of the reflector. FIG. 9 is a front view of the shade when seen from the light source side.

The shade 35 is firmly supported by the lens holder 31 so that it is located nearly in the lower half of the internal space of the lens holder 31 (FIG. 2). The shade 35 is formed so that its upper edge 35_a_ passes the rear focal point F of the projector lens 33. Thus, the shade 35 shields a part of the light reflected from the reflecting surface 29_a_ of the reflector 29, thereby removing the greater part of the upward light projected forward from the projector lens 33. The upper edge 35_a_ of the shade 35 extends in an arc shape horizontally along the rear focal plane of the projector lens 33 and is formed on different levels with respect to an elbow point E.

The shade 35 has a portion 45 for correcting the distributed light pattern projected forward. The portion 45 is composed of convex portions 49, 49 and recesses 51, 51. Specifically, as regards the shade 35, as seen in FIG. 9, at its central area, the convex portion 49 is formed so that the central portion is more convex than the left or right side portion. Further, the shade 35 is recessed by the recesses 51, 51 at the left and right side portions. Because the portion 45 composed of the convexes 49, 49 and recesses 51, 51, even with the projector lens 33 with the rearward surface 33_b_ inclined, the shade 35 projects light left and right sideward to form a distributed light pattern having a cut-off line nearly in parallel to the horizontal direction. In this embodiment, the convexes 49, 49 and the recesses 51, 51 are formed by a curved edge that is curved downward. Further, the convexes 49, 49 and the recesses 51, 51 can be also formed by an inclined straight-line. Incidentally, in FIG. 9, a conventional shade shape is illustrated by broken line.

Next, the structure of the lamp unit 40 will be explained.

As seen from FIGS. 1 and 3, like the lamp unit 20, this lamp unit 40 is also a projector type lamp unit that includes a light source bulb 55, a reflector 57, a lens holder 59 and a projector lens 61.

Unlike the lamp unit 20, the lamp unit 40 does not have the shade 35. However, the other portions of the lamp unit 20 are the same as the lamp unit 20. It should be noted that the reflecting surface 57_a_ of reflector 57 of the lamp unit 40 is shaped so that the converging position of the light emitted from the light source 55_a_ is slightly nearer to the rear focal point F of the projector lens 59 as compared with the converging position of the reflector 29 of the lamp unit 20.

The lamp unit 40 also is supported by the lamp body 21 through the aiming mechanism 50 and aiming brackets 57_d_ of the reflector.

Figure 10A:
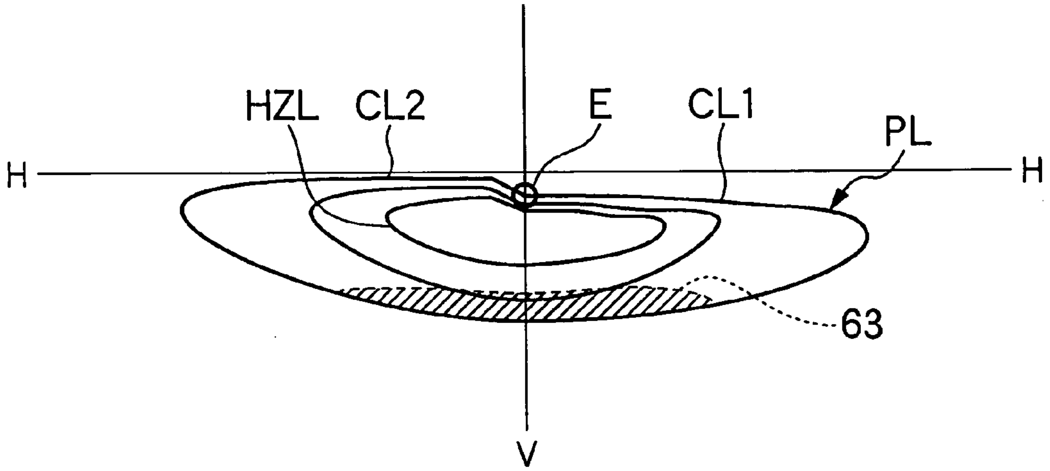
FIG. 10(*a*) is a perspective view of a distributed light pattern formed on a virtual vertical screen which is arranged at a forward position of the lamp, by the light projected forward from a conventional vehicle lamp.
Figure 10B:
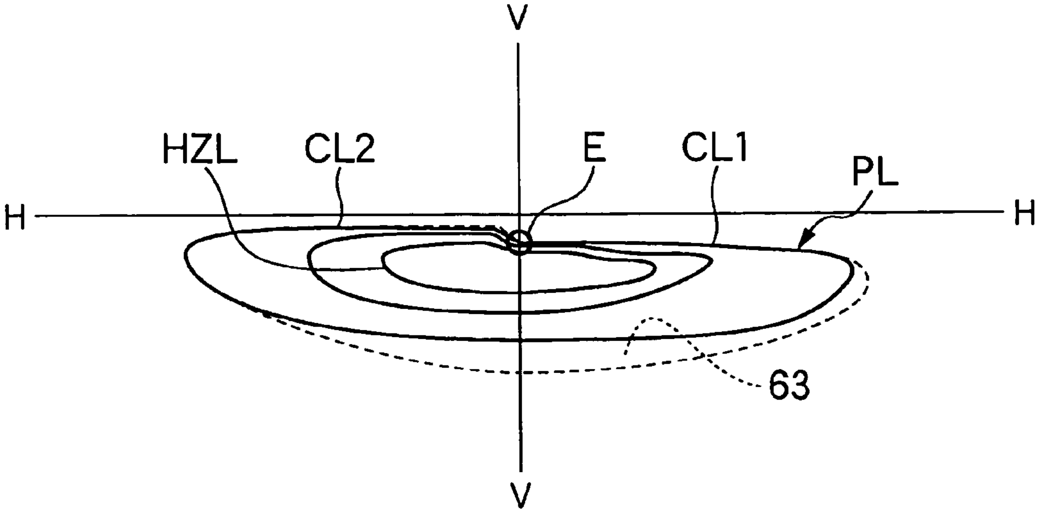

FIG. 10 is a perspective view of the distributed light pattern formed by the light projected forward from the vehicle lamp on a virtual vertical screen which is arranged at a 25 meter forward position of the lamp. FIG. 10(_a_) illustrates a low-beam distributed light pattern formed by lighting of the conventional lamp unit in which the rearward surface 33_b_ of the projector lens 33 is plane and arranged in parallel to the plane vertical to the optical axis Ax. FIG. 10(_b_) illustrates a low-beam distributed light pattern formed by lighting of the lamp unit according to the present exemplary embodiment.

As seen from FIG. 10(_a_), the low-beam distributed light pattern PL is the left-distributed low-beam distributed light pattern having left and right cut-off lines CL1, CL2 at different levels on the upper edge. These cut-off lines CL1, CL2 horizontally extend on left and right different levels with line V-V vertically passing a vanishing point H-V in the front direction of the lamp. Specifically, the on-coming vehicle lane side part on the right side of line V-V is formed as a lower cut-off line CL1, whereas one's own vehicle lane side part of the left side of line V-V is formed as an upper cut-off line CL2 which steps up through a slope from the lower cut-off line CL1. In this low-beam distributed light pattern PL, the position of the elbow point E which is a crossing point of the lower cut-off line CL1 and line V-V is set at a position about 0.5 to 0.6° below H-V. A hot zone HZL which is a high brightness region is formed so as to encircle the elbow point E.

In the conventional lamp unit, since the rearward surface 33_b_ of the projector lens 33 is plane and arranged in parallel to the plane vertical to the optical axis Ax, the longitudinal image of the light source 27_a_ is projected in the front direction of the vehicle. This led a problem that the region 63 on this side of the distributed light pattern becomes bright and a distance place is difficult to see. On the other hand, in the lamp units 20, 40, since the rearward surfaces 33_b_, 61_b_ of the projector lenses 33, 61 are inclined, on the lower side of the projection lenses 33, substantially the same effect as extension of the focal distance can be obtained.

In a vehicle-use projector optical system, generally, the emanating quantity of light is greater on the upper side of the projector lens 33 than on the lower side thereof. Therefore, by the inclined structure of the projector lenses 33, 61 according to this embodiment, the light emanating from the lower side of the projector lenses 33, 61 can be collected so as to enhance the vertical collecting degree of the distributed light pattern. Namely, as seen from FIG. 10(_b_), the vertical width of the distributed light pattern can be decreased so that the light on this side is reduced, and the distant visibility is enhanced.

Additionally, the inclining angle $\alpha$ of the rearward surfaces 33_b_, 61_b_ of the projector lenses 33, 61 from the plane perpendicular to the optical axis Ax can be set in a 10° to 50° range. Now, the inclining angle $\alpha$=10° is an angle enough to substantially provide the inclining effect. If the inclining angle $\alpha$=55° is exceeded, the total reflection within the projector lenses 33, 61 increases to increase the loss of light flux. For this reason, the inclining angle $\alpha$ is optimum in the 10° to 50° range.

The low-beam distributed light pattern PL is formed by light projection from the lamp unit 20. In this case, this low-beam distributed light pattern PL is formed by projecting the image of the light source 27_a_, formed on the rear focal plane of the projector lens 33 by the light reflected from the reflecting surface 29_a_ of the reflector 29, on the above virtual vertical screen as an inverted projected image by the projector lens 33. Its cut-off lines CL1, CL2 are formed as an inverted projected image of the upper edge 35_a_ of the shade 35.

On the other hand, the high-beam distributed light pattern (not shown) based on the lamp unit 40 is constructed of a combined distributed light pattern composed of the low-beam distributed light pattern PL and an additional distributed light pattern formed by light projection from the lamp unit 40.

The additional distributed light pattern formed by the lamp unit 40 has a lengthy horizontally distributed light pattern which extends on both left and right sides of H-V. Its entire diffusing angle is slightly smaller than in the low-beam distributed light pattern PL. Its hot zone is formed on the H-V as a much brighter zone than the hot zone HZL of the low-beam distributed light pattern PL. This is attributable to that the converging position of the light reflected from the reflector 57 of the lamp unit 40 is set at a position near the rear focal point F of the projector lens 61 as compared with the case of the lamp unit 20.

In the high-beam distributed light pattern, by composing the low-beam distributed light pattern PL and the additional distributed light pattern, light projection is done to reach the area above the cut-off lines CL1, CL2 so that a bright hot zone due to superposition of the hot zone HZL is formed in the vicinity of H-V.

As described hitherto in detail, in the vehicle lamp 100 according to this embodiment, the projector lenses 33, 61 are constructed of a planoconvex lens with the rearward surfaces 33*b*, 61*b* being planar, respectively. In addition, the planes of the rearward surfaces 33*b*, 61*b* incline upward from the plane orthogonal to the optical axis Ax extending in the vehicle longitudinal direction. Thus, although the light-transmissive cover 23 has an upward inclined surface shape along the shape of the vehicle body, the projector lenses 33, 61 can be arranged with space-saving along the light transmissive cover 23.

In this case, the one lamp unit 20 is equipped with the shade 35 for shielding a part of the light reflected from the reflector 29. The upper edge 35*a* of the shade 35 is located at the rear focal point F of the projector lens 33 on the optical axis Ax. Thus, by the light projection from the lamp unit 20, the low-beam distributed light pattern PL having the cut-off lines CL1, CL2 at its upper end is formed. In this case, since the convex curve constituting the forward surface 33*a* of the projector lens 33 is constructed as an aspheric curve, the cut-off lines CL1, CL2 can be formed as clear cut-off lines.

Further, the light emanating from the lower side of the projector lenses 33, 61 can be collected so as to enhance the vertical collecting degree of the distributed light pattern. Thus, the vertical width of the distributed light pattern can be decreased so that the light on this side is reduced and the distant visibility is enhanced.

In addition, in the present exemplary embodiment, since the upward angle $\alpha$ of the rearward surface 33*b*, 61*b* of each projector lens 33, 61 is set at a fairly large value of $\alpha$=20°, the new appearance of the lamp design can be sufficiently assured.

Further, the distortion of the distributed light pattern, which is attributed to the fact that light is not projected onto the area to which the light emanating from the projector lens is essentially to be projected because the rearward surfaces 33*b*, 61*b* of the projector lenses 33, 61 are inclined, can be corrected by the portion 45. Namely, since the shade 35 is deformed according to the characteristic of the projector lens 33 inclined, it is possible to prevent the cut-off line from being curved with diffusion by light projection onto the distorted portion of the distributed pattern not light-projected, thereby enhancing the distant visibility in the right/left diffusing direction. As a result, safety during night driving can be improved.

Figure 11:
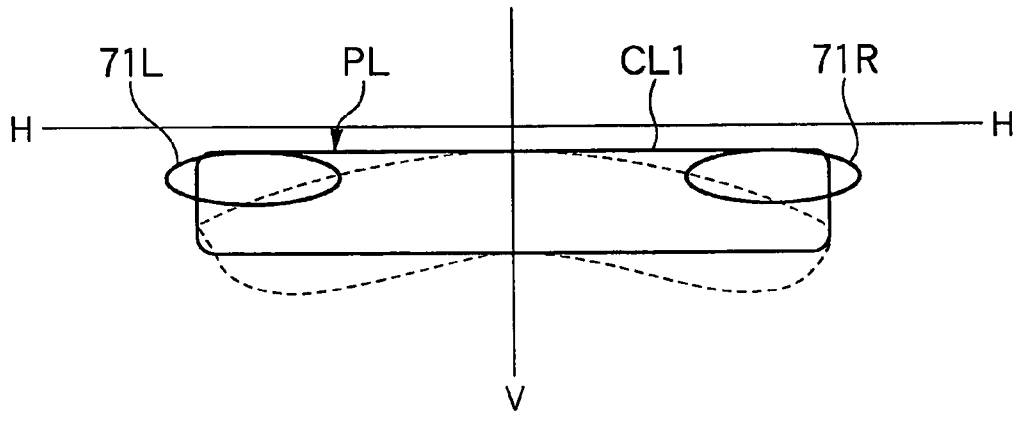
FIG. 11 is a perspective view of the distributed light pattern formed using the shade shown in FIG. 9.

Further, since the shade 35 is designed to project the light left and right sideways to form the distributed light pattern nearly in parallel to the horizontal direction, the cut-off line is not curved downward with diffusion (see broken line in FIG. 11) so that the light diffuses horizontally to form the distributed light pattern PL of the horizontal cut-off line CL. Thus, the distant visibility of the regions 71R, 71L in the right/left diffusing direction can be enhanced.

Figure 15A:
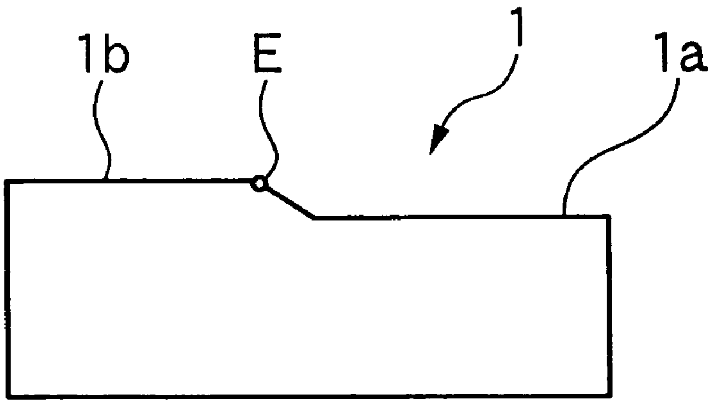
FIG. 15(*a*) is a view showing a conventional shade.
Figure 15B:
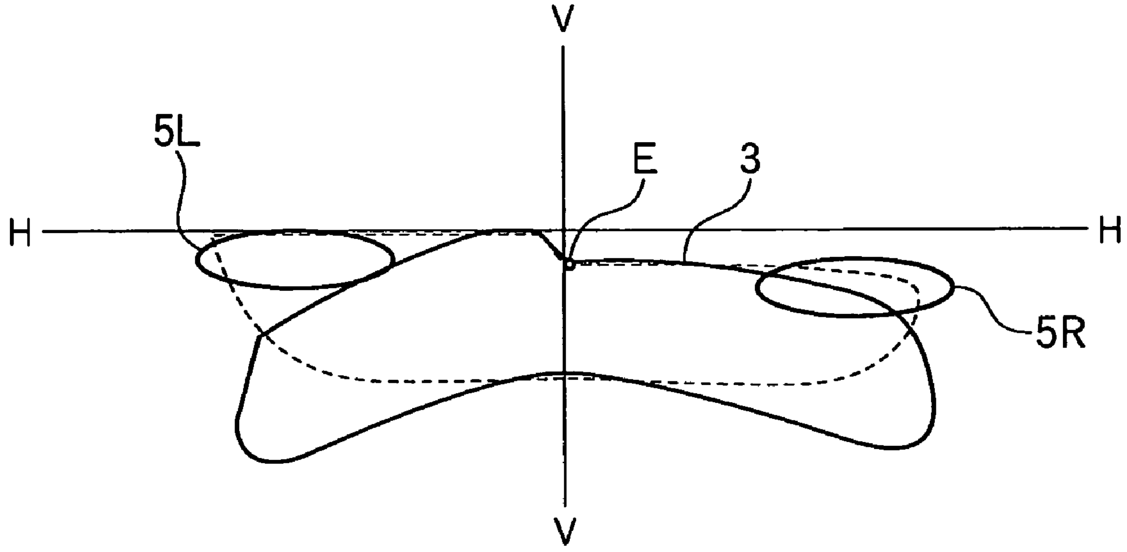
Figure 16A:
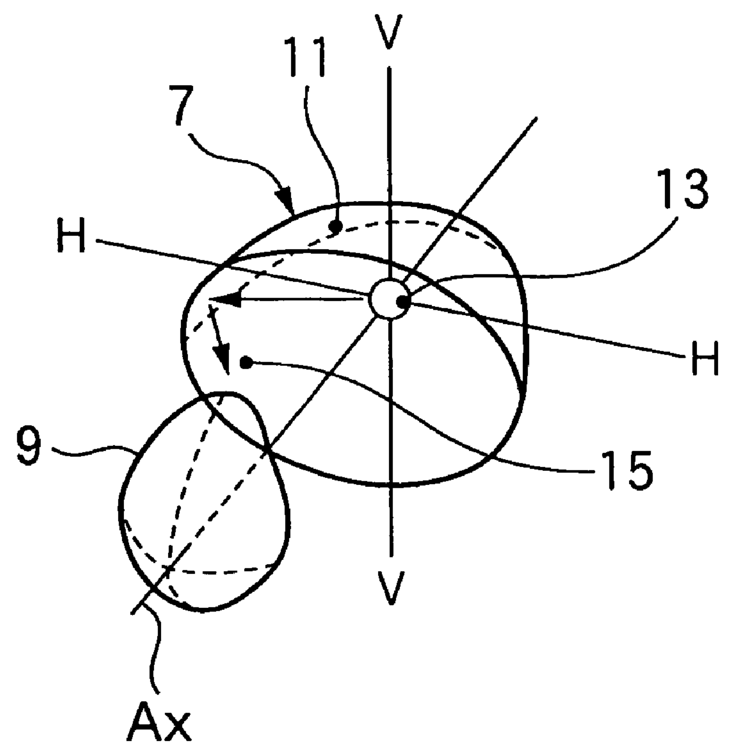
FIG. 16(*a*) is a view showing a conventional reflector.
Figure 16B:
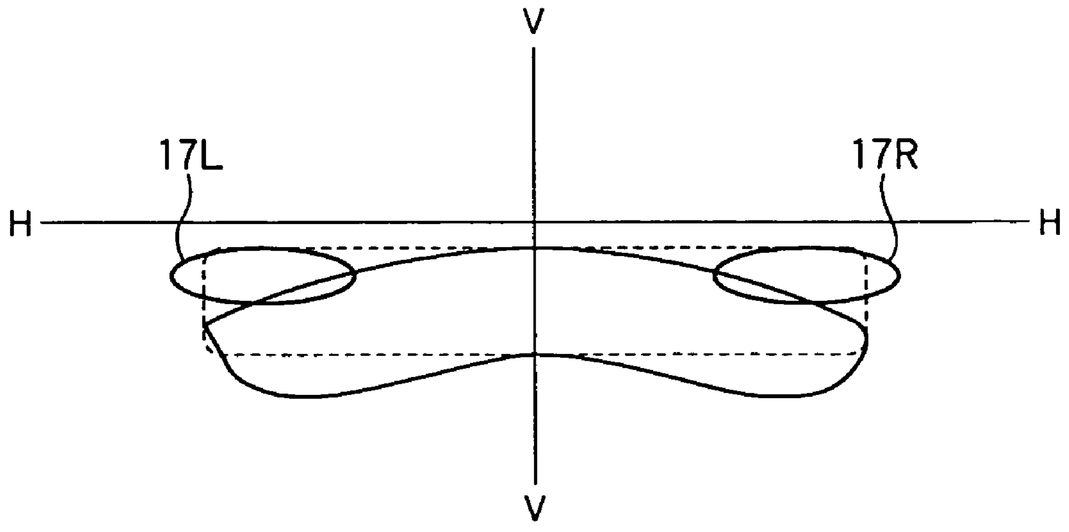

Further, since the shade 35 is provided with the convex portions 49 at its central area, the distortion of the distributed light pattern, which is attributed to the fact that light is projected onto the area to which the light emanating from the projector lens essentially is not to be projected because the rearward surface 33*b* of the projector lens 33 is inclined, can be corrected by the convex shapes. Thus, the distortion of the distributed light pattern (FIG. 15(*b*)) in which the central segment of the cut-off line is swelled can be removed.

Further, since the reflector 29 has the correcting step 41 for correcting the distributed light pattern projected forward, the distortion of the distributed light pattern, which is attributed to the fact that light is not projected onto the area to which the light emanating from the projector lens essentially is to be projected because the rearward surface 33*b* of the projector lens 33 is inclined, can be corrected by the correcting step 41. Thus, it is possible to prevent the cut-off line from being curved by diffusion and to enhance the distant visibility of the regions 73R, 73L in the right/left diffusing direction by light projection onto the distorted portion of the conventional distributed light pattern not light-projected, as seen from FIG. 12. As a result, safety during night driving can be improved.

Further, since the correcting step 41 is formed at the edges 43 in the vicinity of the reflecting surface area of the reflector intersecting the horizontal plane, the left or right side of the cut-off lines CL1, CL2 is not curved with diffusion so that light is diffused horizontally, thereby improving the distant visibility in the right/left diffusing direction.

In addition, the correcting step 41 is formed so that the normal line Di of the reflecting surface 29*a* at the edges 43 is oriented downward more at a farther distance from the straight-line connecting the light source 27*a* and the rear focal point F of the projector lens 33 (i.e. the optical axis Ax). The cut-off line, therefore, is not curved downward with diffusion as seen from FIG. 11. Thus, the reflected light from the light source 27*a* is oriented more downward toward the outside of the reflector 29 from the optical axis Ax of the projector lens 33. As a result, the light passing the projector lens 33 inclined is diffused in the right/left horizontal direction, thereby improving the distant visibility in the right/left direction.

Figure 12:
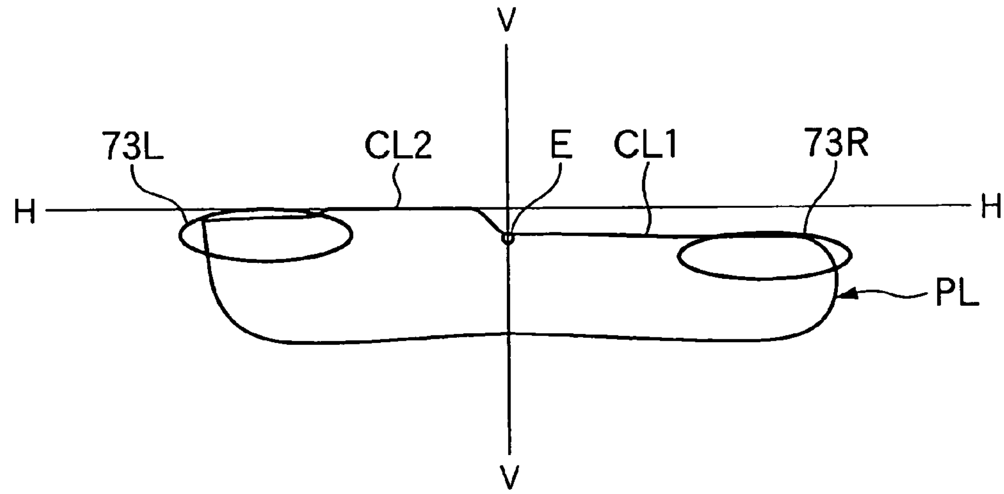
FIG. 12 is a perspective view of the distributed light pattern formed using the reflector shown in FIGS. 6(*a*) and 6(*b*).
Figure 13A:
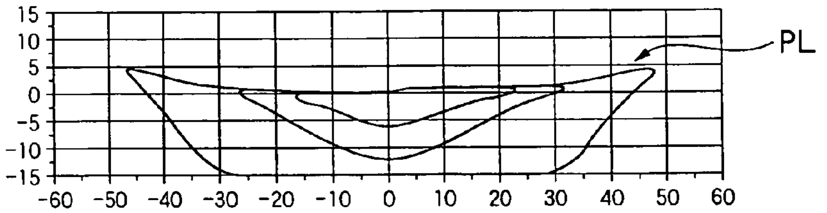
FIG. 13(*a*) is a graph showing a distributed light pattern when the inclining angle is set at 0°.
Figure 13B:
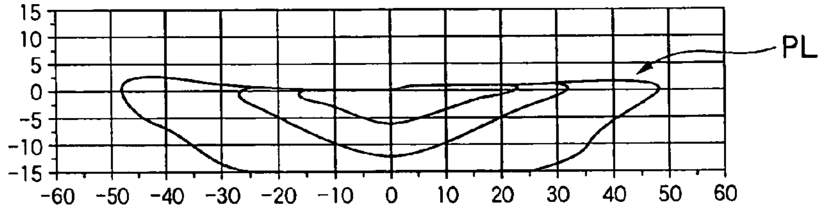
Figure 13C:
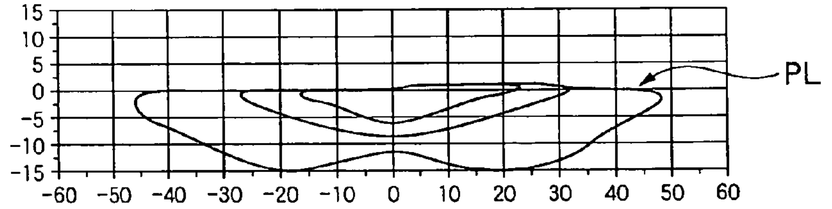
Figure 13D:
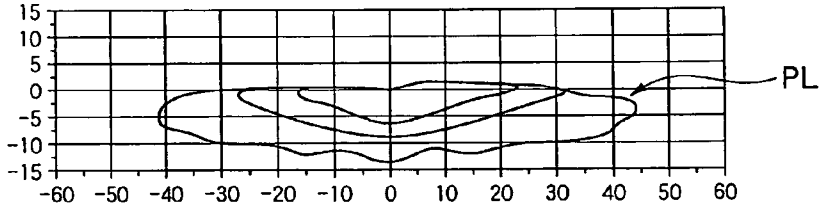
Figure 13E:
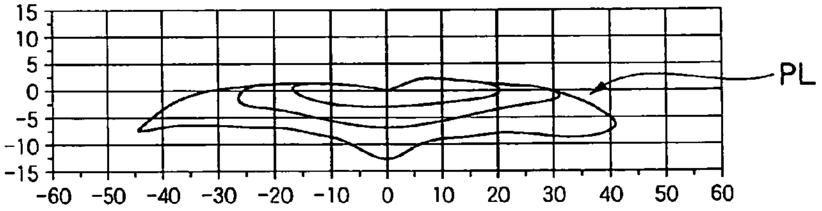
Figure 13F:
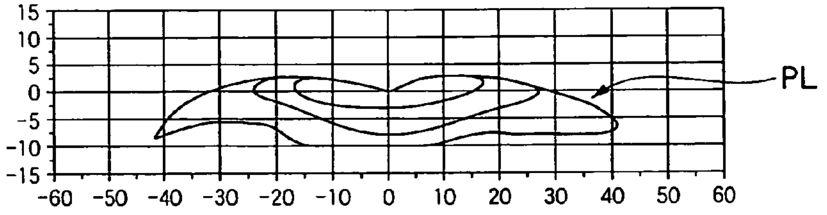
Figure 14A:
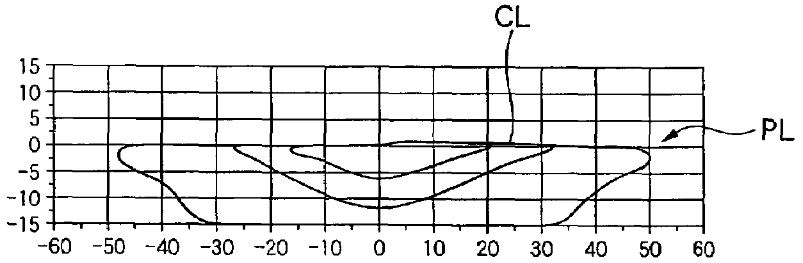
FIG. 14(*a*) is a graph showing the distributed light pattern formed by the conventional lamp unit.
Figure 14B:
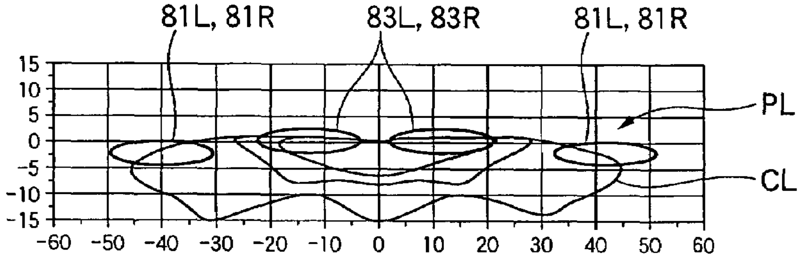
Figure 14C:
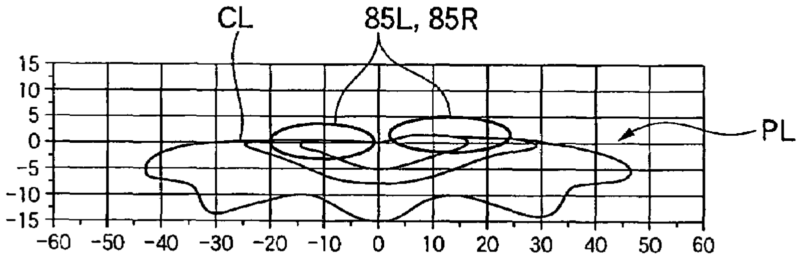
Figure 14D:
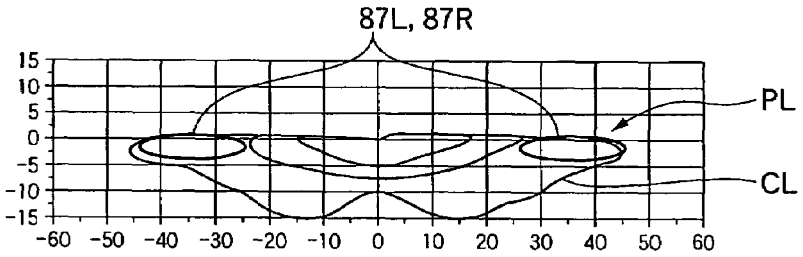
Figure 14E:
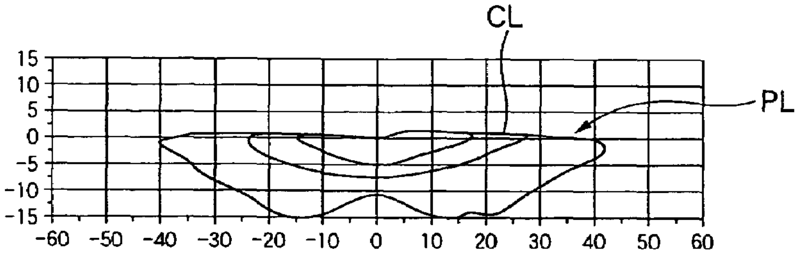

Further, since the shade 35 is partially recessed at the left and right sideward areas, the distributed light pattern PL having the cut-off lines CL1, CL2 nearly parallel to the horizontal direction, as seen in FIG. 12, can be formed by light projection in the left and right sideward direction. Thus, the cut-off line is not curved downward with diffusion unlike the case shown in FIG. 15(*b*) so that the light can be easily diffused in the horizontal direction by only a change in the shape of the shade 35.

An explanation will be given of the comparison result between the distributed light pattern formed by the conventional lamp and that formed by the lamp including the projector lens, shade and reflector having the same construction as that of the projector lens 33, shade 35 and reflector 29 in the above embodiment and manufactured through selective combination of various lens inclining angles and various portion members.

FIGS. 13(*a*) to 13(*f*) are graphs showing the relationship between various lens inclining angles and various distributed light patterns.

FIGS. 13(*a*) to 13(*f*) illustrate distributed light patterns PL formed when the inclining angle $\alpha$ is set at $\alpha$=0°, 10°, 20°, 30°, 40° and 50°. It could be confirmed that as compared with the distributed light pattern PL at the inclining angle $\alpha$=0° illustrated in FIG. 13(*a*), the distributed light patterns PL at the inclining angle $\alpha$ set at $\alpha$=10°, 20°, 30°, 40° and 50° illustrated in FIGS. 13(*b*) to 13(*f*) are narrow in the vertical width, thereby enhancing the vertical light collecting degree.

FIG. 14(*a*) is a graph showing the distributed light pattern formed by the conventional lamp unit.

It could be known that in the conventional lamp unit, although the horizontal cut-off line CL is formed in the distributed light pattern, the distributed light pattern PL is wide in the vertical width and so low in the vertical light collecting degree.

FIG. 14(*b*) is a graph showing the distributed light pattern formed by the projector lens with the inclining angle of 20°.

It could be known that in the projector lens with the inclining angle of 20°, the cut-off line CL of the distributed light pattern PL droops downward in right and left diffused regions 81R, 81L. Also it could be known that the cut-off line CL swells upward in central regions 83R, 83L.

FIG. 14(*c*) is a graph showing the distributed light pattern formed when the shade having the same construction as that in the embodiment described previously is employed for the projector lens with the inclining angle of 20°.

It could be known that in the lamp unit in which the shade having the same construction as in the embodiment described previously is employed for the projector lens with the inclining angle of 20°, the cut-off line CL of the distributed light pattern PL is corrected nearly horizontally in the regions 85R, 85L in the vicinity of the center.

FIG. 14(*d*) is a graph showing the distributed light pattern formed when the reflector having the same construction as that in the embodiment described previously is employed for the projector lens with the inclining angle of 20°.

It could be known that in the lamp unit in which the reflector having the same construction as in the embodiment described previously is employed for the projector lens with the inclining angle of 20°, the cut-off line CL of the distributed light pattern PL is corrected nearly horizontally in right and left diffused regions 87R, 87L.

FIG. 14(*e*) is a graph showing the distributed light pattern formed when the shade and the reflector each having the same construction as in the embodiment described previously is employed for the projector lens with the inclining angle of 20°.

It could be known that in the lamp unit in which the shade and reflector each having the same construction as in the embodiment described previously is employed for the projector lens with the inclining angle of 20°, the cut-off line CL of the distributed light pattern PL is horizontal over nearly the whole region.

Although the vehicle lamp 100 according to the present exemplary embodiment accommodates the two lamp units 20, 40 within the lamp room, it may accommodate either one of these lamp units 20, 40. In this case also, the same effect as in the embodiment described previously can be obtained.

Further, in the present exemplary embodiment, although the upward angles α of the planes constituting the rearward surfaces 33*b*, 61*b* of the projector lenses 33, 61 are set at the same value, both angles may be set at different values. In this case, in the embodiment described previously, although both the upward angles α are set at 20°, they may be set at the value other than 20° as long as they are set with the inclination in a 10° to 50° range, thereby providing the same effect as in the exemplary embodiment.

Further, in the exemplary embodiment, the vehicle lamp 100 was arranged at the right front end of the vehicle. However, in the vehicle lamp also, arranged at the left front end of the vehicle, by adopting the same construction as in the above embodiment, the same advantage as the above embodiment can be obtained.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle lamp comprising:

a light source;

a projector lens, wherein said projector lens is immobile and fixed in position relative to a reflector such that a rear end surface of the projector lens is inclined, and a lower end of the rear end surface of the projector lens protrudes more frontward than an upper end of the rear surface;

the reflector having a focal point near the light source and having a reflecting surface that reflects light emitted from the light source toward the projector lens; and a shade that shields a part of reflected light and has an end in the vicinity of a rear focal point of the projector lens;

wherein the reflector has a correcting step that corrects a distributed light pattern projected forward, wherein the correcting step is provided at a portion of the reflector in the vicinity of an area where the reflecting surface intersects a horizontal plane passing an optical axis of the vehicle lamp, and wherein the correcting step is formed so that the more distant a distance from the optical axis is, the more downward a normal line of the reflecting surface at the portion is oriented.

2. The vehicle lamp according to claim 1, wherein the projector lens has a front face structured so that light incident on the projector lens through the rear focal point of the projector lens is projected forward substantially in parallel.

3. The vehicle lamp according to claim 1, wherein the correcting step is structured to form the distributed light pattern with a cut-off line substantially in parallel to a horizontal direction.

4. The vehicle lamp according to claim 1, wherein the shade is recessed partially at the left and right sideward areas.

5. The vehicle lamp according to claim 4, wherein the shade has a convex portion at a central area which is projected above the right and left sideward areas.

6. The vehicle lamp according to claim 1, wherein the rear end surface of the projector lens is substantially planar.

7. The vehicle lamp according to claim 1, wherein the correcting step is formed so that as the distance from the optical axis increases, the distance between the center of the shade in a horizontal direction and the position at which the reflected light from the correcting step passes across the shade increases.

8. A vehicle lamp comprising:

a light source;

a projector lens, wherein said projector lens is immobile and fixed in position relative to a reflector such that a rear end surface of the projector lens is inclined, and a lower end of the rear end surface of the projector lens protrudes more frontward than an upper end of the rear surface;

the reflector having a focal point near the light source and having a reflecting surface that reflects light emitted from the light source toward the projector lens; and a shade that shields a part of reflected light and has an end in the vicinity of a rear focal point of the projector lens;

wherein the shade has a correcting portion that corrects a distributed light pattern projected forward, the correcting portion comprising the top edge of the shade, wherein right and left side portions of the top edge are inclined downwards from a center portion thereof to the right and left edges of the shade wherein the reflector has a correcting step that corrects the distributed light pattern, wherein the correcting step is provided at a portion of the reflector in the vicinity of an area where the reflecting surface intersects a horizontal plane passing an optical axis of the vehicle lamp, and wherein the correcting step is formed so that the more distant a distance is from the optical axis, the more downward a normal line of the reflecting surface at the portion is oriented.

9. The vehicle lamp according to claim 8, wherein the projector lens has a front face structured so that light incident on the projector lens through the rear focal point of the projector lens is projected forward substantially in parallel.

10. The vehicle lamp according to claim 8, wherein the shade is structured to project the light in right and left sideward direction and to form the distributed light pattern with a cut-off line substantially in parallel to a horizontal direction.

11. The vehicle lamp according to claim 8, wherein the shade has a convex portion at a central area which is projected above the right and left sideward areas.

12. The vehicle lamp according to claim 8, wherein the shade is recessed partially at the left and right sideward area.

13. The vehicle lamp according to claim 8, wherein the rear end surface of the projector lens is substantially planar.

14. The vehicle lamp according to claim 8, wherein the correcting step is formed so that as the distance from the optical axis increases, the distance between the center of the shade in a horizontal direction and the position at which the reflected light from the correcting step passes across the shade increases.

15. The vehicle lamp according to claim 8, wherein the top edge of the shade comprises a curved portion which curves downwards at the left and right sideward areas of the shade.

* * * * *